(12) United States Patent
Keegan

(10) Patent No.: US 8,692,159 B2
(45) Date of Patent: *Apr. 8, 2014

(54) ADDITION OF LITHIUM ALUMINATE TO IMPROVE THE PERFORMANCE OF SELF SHIELDED ELECTRODES

(71) Applicant: Lincoln Global, Inc., City of Industry, CA (US)

(72) Inventor: James M. Keegan, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,887

(22) Filed: Apr. 29, 2013

(65) Prior Publication Data

US 2013/0233840 A1    Sep. 12, 2013

Related U.S. Application Data

(63) Continuation of application No. 12/266,873, filed on Nov. 7, 2008, now Pat. No. 8,450,649.

(51) Int. Cl.
*B23K 35/22* (2006.01)
*B23K 35/362* (2006.01)

(52) U.S. Cl.
USPC .............. 219/145.22; 219/145.23; 219/146.1; 148/23; 148/24

(58) Field of Classification Search
None
See application file for complete search history.

(56) References Cited

U.S. PATENT DOCUMENTS

| 3,620,830 A | 11/1971 | Kramer |
| 3,742,185 A | 6/1973 | Parks |
| 3,767,891 A | 10/1973 | Haverstraw et al. |
| 4,571,480 A | 2/1986 | Sakai et al. |
| 5,512,241 A | 4/1996 | Kramer et al. |
| 5,580,475 A | 12/1996 | Sakai et al. |
| 2010/0102049 A1 | 4/2010 | Keegan |

FOREIGN PATENT DOCUMENTS

JP    01-087100 A    3/1989

OTHER PUBLICATIONS

U.S. Appl. No. 12/147,607, filed Jun. 27, 2008.

*Primary Examiner* — Kiley Stoner
(74) *Attorney, Agent, or Firm* — Perkins Coie LLP

(57) ABSTRACT

A self-shielding welding electrode and a method of making the same are provided. The self-shielding welding electrode contains lithium aluminate in either the flux or the electrode portion of the electrode.

20 Claims, 2 Drawing Sheets

ADDITION OF LITHIUM ALUMINATE TO IMPROVE THE PERFORMANCE OF SELF SHIELDED ELECTRODES

PRIORITY DATA AND INCORPORATION BY REFERENCE

This application is a continuation of prior U.S. application Ser. No. 12/266,873 filed Nov. 7, 2008, now U.S. Pat. No. 8,450,649 which is incorporated herein by reference in its entirety.

BACKGROUND OF THE INVENTION

1. Field of the Invention

Devices, systems, and methods consistent with the invention relate to a method and apparatus of improving the weld performance of self-shielding electrodes.

2. Description of the Related Art

Since their introduction to welding, the use of self-shielding electrodes has grown rapidly. Self-shielding electrodes are used in many types of different welding operations, such as shielded metal arc welding ("SMAW") and flux-cored arc welding ("FCAW"). The many advantages of these welding methodologies are well known and will not be repeated herein. In each of these welding methodologies the electrode generates its own shielding gas, via the flux, to remove oxygen and nitrogen from the area of the molten weld pool and to "kill" the weld pool. The shielding gas is generated by compounds contained in the welding flux which decompose during welding. The released gas reduces the partial pressure of nitrogen and oxygen in the welding arc environment so that absorption of nitrogen and oxygen from the weld pool is reduced.

The need to remove oxygen and nitrogen from the molten weld pool and "kill" the weld pool, and the reasons therefore, are also well known.

To achieve the removal of oxygen and nitrogen from the weld metal, typical self-shielding electrodes contain a certain quantity of aluminum in either the flux or the metal electrode, or both. The presence of aluminum aids in blocking nitrogen and oxygen from the weld metal, as well as "killing" the weld pool. Specifically, the added aluminum helps to take nitrogen and oxygen out of the weld pool by reacting with it to create aluminum nitride and aluminum oxide. Most of the aluminum nitride and aluminum oxide then floats out of the weld pool while some remains within the weld metal. However, the use of aluminum is not without its drawbacks.

Specifically, the presence of aluminum in the weld metal has the tendency to close the gamma loop on the iron-carbon phase diagram, see FIG. 1. Because of this; the presence of aluminum tends to restrict the phase transformation from the delta to the gamma to the alpha phases, A result of this restriction is the creation of large unrefined grains in the structure of the weld metal. The presence of large unrefined grain structure in the weld metal results in a weld which has poor ductility, i.e. the weld is brittle. In many applications, a brittle weld is undesirable.

These drawbacks from aluminum can be enhanced due to the use of lithium ferrate in the electrodes. Lithium ferrate is often used in self-shielding electrodes because the lithium disassociates to lithium gas which aids in diluting the nitrogen from air around the weld. However, because of the intense heat and energy which is typical to welding the lithium ferrate may react with the aluminum from the electrode in what is known as a thermite reaction. Because of this reaction it is often necessary to add additional aluminum to the electrode. However, often the thermite reaction goes to varying degrees of completion. Because of this, any excess aluminum which is not reacted will end up in the weld metal in varying concentrations, often within the same weld. This is disadvantageous for the reasons set forth above.

Accordingly, an electrode composition is needed which blocks the entry of nitrogen and oxygen into the weld metal and does not close or significantly interfere with the phase transformations in the weld metal.

BRIEF SUMMARY OF THE INVENTION

A welding electrode, in accordance with an embodiment of the present invention, contains a metallic electrode portion and a flux portion which is adjacent to the metallic electrode portion. At least one of the metallic electrode portion and the flux portion contains lithium aluminate.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
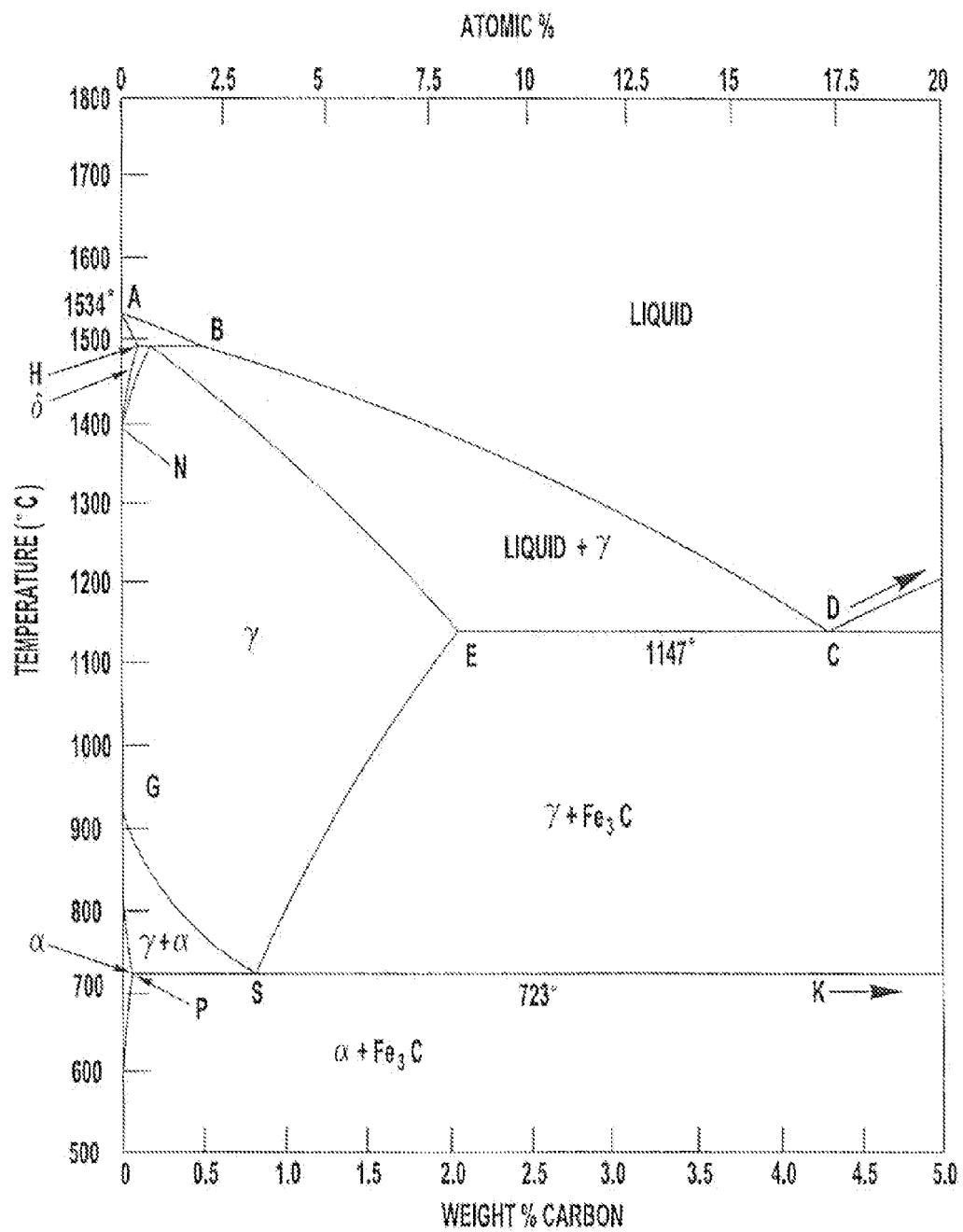
FIG. 1 illustrates a diagrammatical representation of an iron-carbon phase diagram.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts an iron-carbon phase diagram showing each of the equilibrium phases of the thermodynamically distinct gamma, delta and alpha phases of steel. Because those of ordinary skill in the art understand the information set forth in the iron-carbon diagram, a detailed discussion herein will be omitted. FIG. 1 is merely provided as a reference to aid in further understanding of the following discussion of the present invention.

Figure 2A:
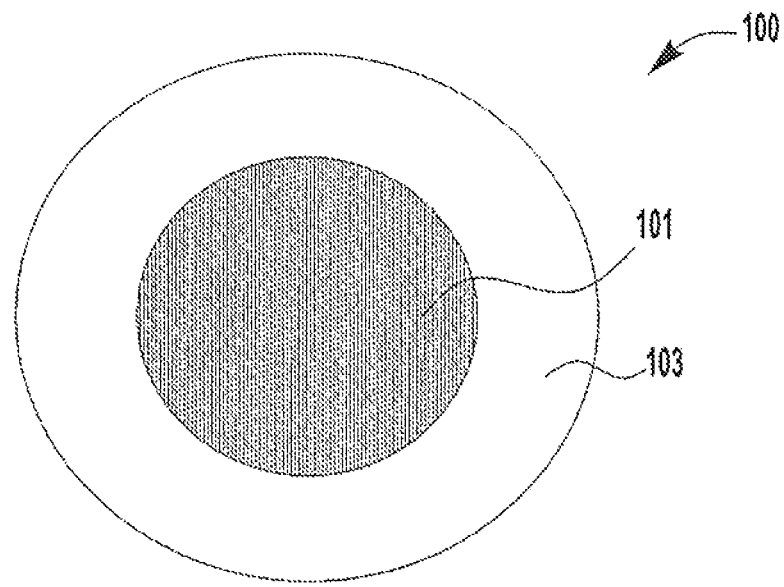
FIGS. 2A and 2B illustrate diagrammatical representations of cross-sections of electrodes in accordance with embodiments of the present invention.
Figure 2B:
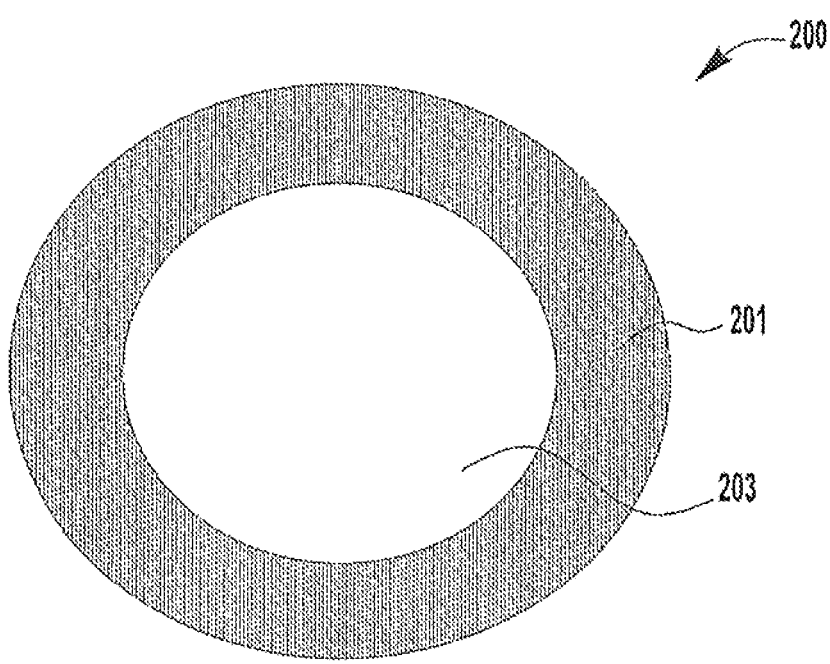

Turning now to FIGS. 2A and 2B, cross-sections of self-shielding welding electrodes 100/200 are depicted. In FIG. 2A the electrode 100 is a flux-cored electrode in which a flux core 101 is surrounded by a metal electrode portion 103. FIG. 2B depicts a self-shielding electrode 200 often referred to as a "stick electrode" in which a metal core electrode portion 203 is surrounded by a coating of flux 201. In each configuration, the flux 101/201 is employed to create a shielding gas during the welding operation to, inter alia, remove oxygen and nitrogen from the weld metal. This is accomplished by shielding air from the weld pool. It should be noted that the overall physical dimensions of the electrodes, such as diameter, etc., are similar to that of known electrodes, and the present invention is not limited in this regard.

In an embodiment of the present invention, at least one of the flux 101/201 and electrode portion 103/203 contain lithium aluminate ($LiAlO_2$). In the present invention, the lithium aluminate in flux 101/201 and/or electrode portion 103/203 decomposes in the welding arc, similar to lithium ferrate. This decomposition causes the lithium to disassociate from the aluminate. The lithium then acts to dilute the nitrogen present in the weld area (similar to that described above regarding lithium ferrate), while the aluminate is primarily deposited in the weld slag, which is removed from the weld area after the weld is complete. Unlike lithium ferrate (LiFeO$_2$), lithium aluminate does not react in the plasma arc to cause a thermite reaction.

Without this reaction, the aluminum recovery within the weld metal is more predictable and consistent. Thus, the variances of aluminum in the weld metal are minimized. Because of the this minimization in variances, weld strength and toughness can be more closely controlled and be made more consistent in weld metal.

Additionally, because the use of lithium aluminate makes the aluminum recovery within the weld metal more predictable and consistent the overall amount of aluminum needed within the electrode can be reduced. Specifically, there is no need to place extra aluminum within the electrode 100/200.

Thus, with various embodiments of the present invention, the use of lithium aluminate allows for the reduction of the amount of aluminum in the overall electrode 100/200, without a decrease in the shielding performance of the electrode and without any adverse metallurgical affects in the resulting weld. In fact, using electrodes in accordance with various embodiments of the present invention will result in improved metallurgical properties over prior art electrodes because the overall amount of aluminum remaining in the weld is reduced. Additionally, the weld strength and toughness can be maintained more consistent within a weld and from different weld to different weld.

As discussed previously, the presence of aluminum in a weld pool can interfere with the phase transformation of steel from its delta to gamma to alpha phases. (See FIG. 1). In particular, the presence of aluminum tends to close the gamma loop on the iron-carbon phase diagram, FIG. 1. This results in the creation of a large unrefined grain structure in the weld, which leads to a weld lacking toughness and durability (i.e. the weld can be brittle). However, in prior electrodes an additional amount of aluminum was needed to be added to an electrode because, as discussed above, some of the electrodes aluminum was consumed in the thermite reaction. Because of this consumption an extra amount of aluminum was needed in an electrode to ensure that there was a sufficient amount of aluminum to act as a denitrider and deoxidizer during the welding process. But, because of the volatility and variability of the thermite reaction, the amount of aluminum consumed in that reaction can vary significantly and can result in increased amounts of aluminum in the weld metal.

By employing electrodes of the present invention, the thermite reaction is avoided, thus ensuring that little or no aluminum is unnecessarily consumed and lost. Accordingly, the amount of aluminum needed in the electrode is reduced (there is no need to add extra aluminum because of the thermite reaction) and the consistency in welds can be maintained. Because of this greater control of the amount of aluminum, the adverse metallurgical affects are avoided and/or eliminated, while maintaining the desired shielding capabilities of the electrode. In fact, electrodes in accordance with embodiments of the present invention can result in superior metallurgical properties, such as weld toughness, over prior art electrodes.

It is also noted that, in addition to the reactions between aluminum and acidic oxides, such as lithium ferrate, magnesium (Mg) reacts with the same acidic oxides. This magnesium reaction is beneficial for the welding process, as iron is reduced into the weld metal and MgO is created. During these reactions, the lithium enters its gaseous state and assists with the shielding by reducing the partial pressure of nitrogen.

The following two reactions represent reactions which occur in the welding arc plasma using a prior art electrode:

$$4Al+3LiFeO_2 \rightarrow 2Al_2O_3+3Fe+3Li, \text{ and}$$

$$2Mg+LiFeO_2 \rightarrow 2MgO+Fe+Li$$

In an embodiment of the present invention, lithium aluminate is employed. By using lithium aluminate, the lithium is still dissociated in the welding arc plasma, but very little or no lithium or aluminum is reduced into the weld metal. By using lithium aluminate, the following two reactions can be created:

$$2LiAlO_2 \rightarrow Li_2O+Al_2O_3, \text{ and}$$

$$2LiAlO_2 \rightarrow 2Li+Al_2O_3+\tfrac{1}{2}O_2$$

Either or both of the reactions can be created when using an electrode 100/200 in accordance with an embodiment of the present invention.

In either of the reactions above, the aluminate is deposited in the weld slag, and then removed when the slag is removed.

In an embodiment of the invention, the lithium aluminate completely replaces the lithium ferrate in an electrode. For example, if an electrode flux contains about 7% lithium ferrate it can be replaced with about 7% lithium aluminate. In another embodiment, the flux contains a mixture of lithium aluminate and lithium ferrate.

In a further embodiment of the present invention, the electrode flux contains lithium zirconate instead of lithium aluminate. In this embodiment, the lithium zirconate reacts similarly to the lithium aluminate. In an additional optional embodiment of the present invention, a combination of lithium aluminate and lithium zirconate can be employed. The exact amounts and ratios of lithium aluminate and/or lithium zirconate may be adjusted for desired weld characteristics and electrode performance.

In an embodiment of the present invention, the electrode flux contains up to about 7% by weight of lithium aluminate. Additionally, the flux can contain lithium aluminate in the range of about 1 to 20 percent. In another embodiment, the flux contains lithium aluminate in the range of about 5 to 7 percent.

In an embodiment containing lithium zirconate, the electrode flux contains up to about 7% by weight of lithium zirconate. Additionally, the flux can contain lithium zirconate in the range of about 1 to 20 percent. In another embodiment, the range of lithium zirconate can be in the range of about 5 to 7 percent.

In an embodiment containing both lithium aluminate and lithium zirconate, the respective ranges can be about 5 to 7 percent, respectively.

In a further exemplary embodiment, the flux contains up to about 8% by weight of magnesium oxide. Additionally, the flux can contain in the range of about 1 to about 15 by weight of magnesium oxide.

In another embodiment of the present invention, the electrode flux contains a combination of lithium aluminate and magnesium oxide, where both combine to make up about 1 to 15% by weight. In an alternative embodiment, the flux contains about 6 to 8% by weight of lithium aluminate and about 8 to 8% by weight of magnesium oxide. In a further exemplary embodiment of the present invention, the flux contains about 6 to 7% by weight of lithium aluminate and about 8 to 7% by weight of magnesium oxide.

In a further alternative embodiment of the present invention, the electrode flux contains cerium oxide. In an embodiment, the flux can contain up to about 12% by weight of cerium oxide. In another embodiment, the flux contains about 2 to about 5% by weight of cerium oxide.

In an embodiment of the invention, the lithium aluminate, lithium zirconate, magnesium oxide and/or cerium oxide, or combinations thereof, are present only in the flux 101/201 of the electrode 100/200. In another embodiment of the present invention, at least a portion any of these components can be contained in the electrode portion 103/203 of the electrode 100/200. Because these compounds are often available in powder and/or granular form, placement of them in the flux 101/201 of an electrode 100/200 is the most convenient from a manufacturability view. In such an embodiment the components can be added to the flux during the flux mixing process and then added to the electrode 100/200 during the manufacturing process. However, the present invention is not limited on this regard, and the lithium aluminate, lithium zirconate, magnesium oxide and/or cerium oxide can be added to only the electrode portion 103/203 during the manufacture of the electrode portion 103/203. Of course, if this is done it may be necessary to adjust the percentages by weight discussed above. This is well within the capabilities of those skilled in the art. Further, as indicated above, the lithium aluminate, lithium zirconate, magnesium oxide and/or cerium oxide, or combinations thereof, can be added to both the flux 101/201 and electrode portion 103/203 during their respective manufacturing steps.

Prior welding electrodes can have up to about 12% aluminum by weight of the flux. Other electrodes can have an amount of aluminum in the range of 8 to 15% by weight, depending on the electrode application and type. The use of these prior electrodes can result in weld deposits having about 1.12% by weight of aluminum, and the use of some electrodes result in weld deposits having as high as about 1.5% by weight of aluminum. However, it is known that as the amount of aluminum in weld deposits approaches about 1.5%, or more, by weight of the weld deposit, the weld tends to become brittle and lack the needed toughness.

By employing electrodes 100/200 of the present invention the resulting amount of aluminum in a weld deposit can be reduced, thus providing a weld with improved metallurgical characteristics such as toughness.

Because the benefits of the present invention, the need to add additional aluminum to the electrode is mitigated. Therefore, electrodes in accordance with an embodiment of the present invention, contain up to about 22% by weight of flux. In a further exemplary embodiment, the electrode contains up to about 15% by weight of flux.

Of course it is understood to those of ordinary skill in the art that due to various manufacturing techniques, trace amounts of aluminum may exist in an electrode as a function of manufacturing processes and the materials used. For purposes of the above embodiment, the present invention contemplates replacing the amount of intentionally added aluminum with lithium aluminate.

The overall amounts of lithium aluminate, lithium zirconate, magnesium oxide and/or cerium oxide used may be a function of the desired performance of the electrode 100/200 with regard to its ability to provide the needed deoxidization and denitridation and produce a weld having desirable metallurgical properties, such as toughness.

By employing various embodiments of the present invention, the amount of aluminum in weld metal can be reduced and/or maintained consistently, without a decrease in shielding performance.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding electrode, comprising:
   a metallic electrode portion, and
   a flux portion adjacent to the metallic electrode portion,
   wherein at least one of said metallic electrode portion and flux portion contains at least one of lithium aluminate and lithium zirconate, and
   wherein the flux portion contains both lithium aluminate and magnesium oxide, and wherein the flux portion contains about 1 to about 15% by weight of lithium aluminate and magnesium oxide combined.

2. A welding electrode, comprising:
   a metallic electrode portion, and
   a flux portion adjacent to the metallic electrode portion,
   wherein at least one of said metallic electrode portion and flux portion contains lithium aluminate, and at least one of about 1 to about 15% by weight of magnesium oxide and cerium oxide.

3. The welding electrode of claim 2, wherein the electrode does not contain lithium ferrate.

4. The welding electrode of claim 2, wherein the flux portion contains up to about 8% by weight of magnesium oxide.

5. The welding electrode of claim 2, wherein the flux portion contains cerium oxide.

6. A welding electrode, comprising:
   a metallic electrode portion, and
   a flux portion adjacent to the metallic electrode portion,
   wherein at least one of said metallic electrode portion and flux portion contains at least one of lithium aluminate and lithium zirconate, and at least one of magnesium oxide and cerium oxide, and
   wherein the flux portion contains both lithium aluminate and magnesium oxide, and
   wherein the flux portion contains about 1 to about 15% by weight of lithium aluminate and magnesium oxide combined.

7. A welding electrode, comprising:
   a metallic electrode portion, and
   a flux portion adjacent to the metallic electrode portion,
   wherein at least one of said metallic electrode portion and flux portion contains at least one of lithium aluminate and lithium zirconate, and at least one of magnesium oxide and cerium oxide, and
   wherein the flux portion comprises lithium aluminate and about 1 to about 15% by weight of magnesium oxide.

8. The welding electrode of claim 5, wherein the flux portion contains about 12% by weight of cerium oxide or less.

9. The welding electrode of claim 5, wherein the flux portion contains about 2% to about 5% by weight of cerium oxide.

10. The welding electrode of claim 7, wherein the flux portion contains about 8% by weight of magnesium oxide or less.

11. The welding electrode of claim 7, wherein the flux portion contains about 1 to about 20% by weight of lithium aluminate.

12. The welding electrode of claim 7, wherein the flux portion contains about 5 to about 7% by weight of lithium aluminate.

13. The welding electrode of claim 7, wherein said flux portion contains about 6 to about 8% by weight of lithium aluminate and about 6 to about 8% by weight of magnesium oxide.

14. The welding electrode of claim 13, wherein the flux portion contains about 6 to about 7% by weight of lithium aluminate and about 6 to about 7% by weight of magnesium oxide.

15. The welding electrode of claim 1, wherein the flux portion contains about 7% by weight of lithium zirconate or less.

16. The welding electrode of claim 1, wherein the flux portion contains about 1 to 20% by weight of lithium zirconate.

17. The welding electrode of claim 1, wherein the flux portion contains about 5 to 7% by weight of lithium zirconate.

18. The welding electrode of claim 6, wherein the flux portion contains about 7% by weight of lithium zirconate or less.

19. The welding electrode of claim 6, wherein the flux portion contains about 1 to 20% by weight of lithium zirconate.

20. The welding electrode of claim 6, wherein the flux portion contains about 5 to 7% by weight of lithium zirconate.

* * * * *